United States Patent [19]

Kadlec

[11] Patent Number: 5,172,523

[45] Date of Patent: Dec. 22, 1992

[54] COMPACT FISH HOOK SHARPENING DEVICE

[76] Inventor: Richard W. Kadlec, 7809 Sprucewood, Woodridge, Ill. 60517

[21] Appl. No.: 772,810

[22] Filed: Oct. 8, 1991

[51] Int. Cl.⁵ .............................. B24B 19/16
[52] U.S. Cl. ........................ 51/204; 76/88
[58] Field of Search ............ 51/173, 204, 211 R, 51/214, 205 WG; 76/88

[56] References Cited

U.S. PATENT DOCUMENTS

| | | | |
|---|---|---|---|
| 990,592 | 4/1911 | Riley | 51/214 |
| 2,380,539 | 7/1945 | Miller | 51/211 R |
| 2,724,221 | 11/1955 | Shaw | |
| 2,766,643 | 10/1956 | Marks | |
| 2,766,644 | 10/1956 | Marks | |
| 3,436,870 | 4/1969 | Sellman | |
| 3,719,461 | 3/1973 | Topping | 51/204 |

Primary Examiner—Roscoe V. Parker
Attorney, Agent, or Firm—Henderson & Sturm

[57] ABSTRACT

A reciprocating hook sharpening device (10) for sharpening fish hooks (100); wherein, the device (10) has a sharpening member (30) having different coarseness surfaces (33) (34) (36) which reciprocates within a housing member (20) having different width apertures (25) to accept fish hooks (100) having different diameters.

10 Claims, 1 Drawing Sheet

COMPACT FISH HOOK SHARPENING DEVICE

TECHNICAL FIELD

The present invention relates to fish hook sharpening devices in general, and in particular to a reciprocating fish hook sharpening device.

BACKGROUND ART

This invention was the subject matter of Document Disclosure Program Registration No. 269,335 which was filed in the United States Patent and Trademark Office on Dec. 14, 1990.

As can be seen by reference to the following U.S. Pat. Nos. 2,766,643; 2,724,221; 2,766,644; and 3,436,870; the prior art is replete with myriad and diverse generally stationary single and multiple structural element fish hook sharpening devices.

While all of the aforementioned prior art constructions are more than adequate for the basic purpose and function for which they have been specifically designed, these patented constructions have been uniformly deficient with regard to the provision of a simply constructed moveable fish hook sharpening device; wherein, the sharpening member has different roughness surfaces which can be selectively reciprocated relative to a stationary fish hook; and, wherein each forward and reverse reciprocating stroke imparts a sharpening effect to the dull fish hook surface.

As a consequence of the foregoing situation, there has existed a longstanding need for a new type of simply constructed reciprocating fish hook device that is very compact and simple to use; wherein, a fisherman will almost be compelled out of necessity to purchase this item for their tackle box; and, the provision of such a construction is a stated objective of the present invention.

DISCLOSURE OF THE INVENTION

Briefly stated, the fish hook sharpening device which comprises in general a rigid housing member which surrounds a multi-surfaced sharpening member which is spring biased outwardly relative to the housing member.

In addition each side of the rigid housing member is further provided with a plurality of different shaped apertures which will accept different thickness hook shanks.

As will be explained in greater detail further on in the specification, the reciprocating fish hook sharpening device of this invention imparts a sharpening stroke to the hook material on both the forward and reverse strokes of the sharpening member relative to the stationary fish hook practically halving the time that it takes to sharpen a hook using conventional techniques and devices.

Furthermore, this device allows the user to place the hook point at a remote location relative to the users hand, to minimize the possibility that the sharpened hook will puncture the users flesh during the sharpening process.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 3:
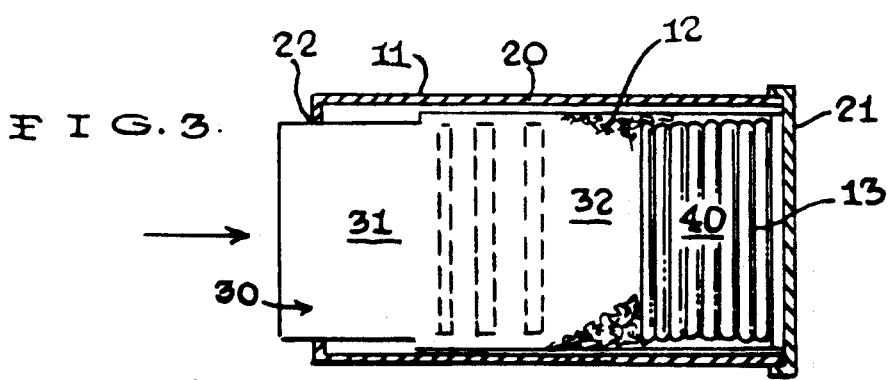
FIG. 3 is a cross-sectional view of the device at the end of the inboard stroke; and, FIG. 4 is a cross-sectional view of the device at the end of the outboard stroke.
Figure 4:
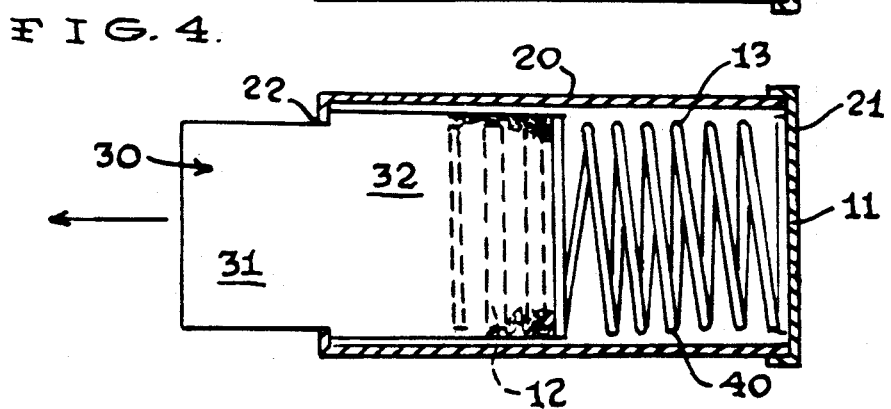

As can be seen by reference to the drawings, and in particular to FIGS. 3 and 4 the fish hook sharpening device that forms the basis of the present invention is designated generally by the reference numeral (10). The sharpening device (10) comprises a housing unit (11) a sharpening unit (12) and a spring bearing unit (13).

Figure 1:
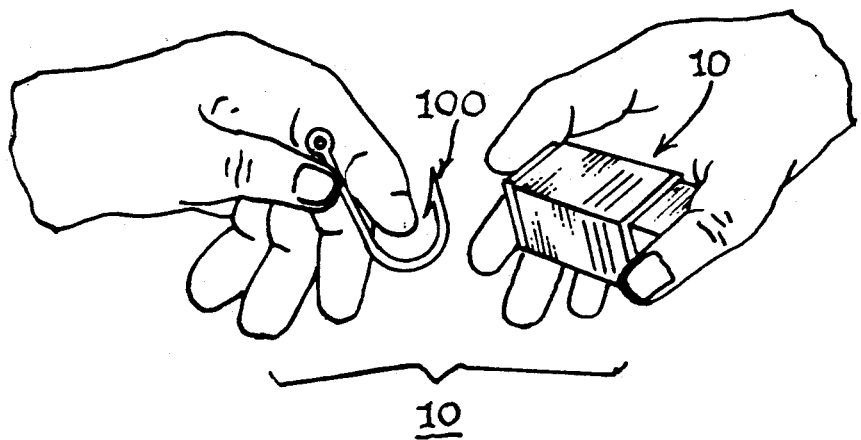
FIG. 1 is a perspective view of the fish hook sharpening device of this invention in use.
Figure 2:
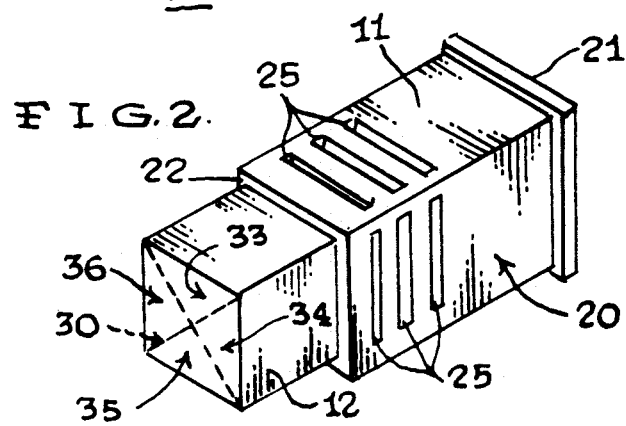
FIG. 2 is an isolated perspective view of the sharpening device.

As shown in FIGS. 2 through 4 the housing unit (11) comprises a generally rectangular housing member (20) having an enlarged cap member (21) formed on one end; and, a stepped shoulder reduced diameter portion defining a generally rectangular opening (22) formed on its other end.

In addition each of the sides of the housing member (20) are provided with a plurality of different width elongated rectangular slots (25) which are dimensioned to accept fish hook shanks (100) of different diameters, as will be explained in greater detail further on in the application.

As can also best be seen by reference to FIGS. 2 through 4, the sharpening unit (12) comprises a generally elongated rectangular sharpening member (30) such as a stone or ceramic sharpener having a stepped shoulder reduced diameter outboard end (31) and an enlarged diameter inboard end (32); wherein, the outboard end (31) of the sharpening stone member is dimensioned to be slideably received in the reduced diameter rectangular opening (22) in the housing member (20); and, wherein the enlarged diameter inboard end (32) of the sharpening member (30) is limited in the outboard direction by the presence of the stepped shoulder portion of the housing member (30).

In addition each of the sides of the sharpening member (30) is provided with a different coarseness sharpening quadrant element (33) (34) (35) and (36) such as rough, course, fine, and superfine such that different types of sharpening surfaces can be brought into contact with the fishing hook.

Turning now to FIGS. 3 and 4 it can be seen that the spring biasing unit (13) comprises a helical compression spring (40) having one end bearing against the enlarged cap member (21) of the housing member (20); wherein the other end spring biases the inboard end (32) of the sharpening member into engagement with the stepped shoulder portion of the housing member (20).

In operation a fisherman would choose the grade of coarseness that he wished to apply to the fish hook (100) and rotate the device (10) until the selected quadrant (33)(34)(35) or (36) was facing directly towards the fisherman. Then the user would place the fish hook (100) into the appropriate sized slot (25) in the housing member (20) to immobilize the fish hook (100) at which point a simple push and release of the sharpening member (30) will effect the desired degree of sharpening of the fish hook from the selected sharpening member quadrant; wherein, the process can be repeated on subsequent sharpening member quadrants.

It should further be noted that even though this invention has been described with respect to a generally rectangular housing member 920) and a generally rectangular sharpening stone (30); it is to be understood that this invention also contemplates the use of a triangular configuration for both the sharpening member (30) and the housing member (20).

Having thereby described the subject matter of the present invention, it should be apparent that many substitutions, modifications and variations of the invention are possible in light of the above teachings.

It is therefore to be understood that the invention as taught and described herein is only to be limited to the extent of the breadth and scope of the appended claims.

I claim:

1. A compact reciprocating fish hook sharpening device for fish hooks; wherein, the device comprises:
    a generally rigid housing member having at least three interconnected generally flat sides; wherein, each of said sides is provided with a plurality of elongated apertures; and,
    a sharpening stone member mounted for reciprocation within said housing member; wherein, said sharpening stone member has at least three interconnected generally flat sides disposed adjacent to said at least three interconnected generally flat sides of said housing member.

2. The device as in claim 1; wherein, a spring biasing means is disposed intermediate said sharpening stone member and said housing member.

3. The device as in claim 1; wherein, said generally rigid housing member has a fourth interconnected generally flat side to define a generally elongated rectangular housing member.

4. The device as in claim 3; wherein, said sharpening stone member has a fourth interconnected generally flat side defining a generally elongated rectangular sharpening stone member.

5. The device as in claim 4; wherein, said generally elongated rectangular housing member is provided with an enlarged cap member on one end, and a stepped shoulder portion defining a reduced diameter rectangular opening on the other end.

6. The device as in claim 5; wherein, the sharpening member has an enlarged end disposed within the housing member, and a reduced diameter end slideably disposed in said reduced diameter rectangular opening.

7. The device as in claim 6; wherein, said spring biasing means comprises a helical spring member having one end bearing against the enlarged cap member and the other end bearing against the sharpening member.

8. The device as in claim 1 wherein at least two of said at least three interconnected flat sides of said sharpening member have sharpening segments of different coarseness.

9. The device as in claim 1; wherein, all of said flat sides of said sharpening member have sharpening segments of different coarseness.

10. The device as in claim 1; wherein, said elongated apertures in each of the sides of the housing member have different widths.

* * * * *